United States Patent [19]
Fisher et al.

[11] Patent Number: 6,047,264
[45] Date of Patent: *Apr. 4, 2000

[54] METHOD FOR SUPPLYING AUTOMATIC STATUS UPDATES USING ELECTRONIC MAIL

[75] Inventors: Alan S. Fisher, Fremont; Samuel Jerrold Kaplan, Hillsborough, both of Calif.

[73] Assignee: Onsale, Inc., Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/725,635

[22] Filed: Oct. 8, 1996

Related U.S. Application Data

[63] Continuation-in-part of application No. 08/695,095, Aug. 8, 1996, abandoned.

[51] Int. Cl.⁷ .................................................... G06F 15/21
[52] U.S. Cl. ................................ 705/26; 705/40; 705/27; 705/28; 705/29; 705/7; 705/8; 705/11
[58] Field of Search .................................. 705/26, 27, 28, 705/29, 7, 8, 11, 1

[56] References Cited

U.S. PATENT DOCUMENTS 4,975,841  12/1990  Kehnemuyi et al. ..................... 705/32

*Primary Examiner*—Allen R. MacDonald
*Assistant Examiner*—Jagdish Patel
*Attorney, Agent, or Firm*—Adam H. Tachner; Crosby, Heafey, Roach & May

[57] ABSTRACT

A method is disclosed for automatically updating the status of customers' orders and shipments via electronic mail without using a human attendant to create and send the electronic mail messages. Preferably implemented in software, the updating method allows a large set of customers to be periodically updated over a computer or communications network via electronic mail. The method utilizes a database for maintaining order and shipping status and other relevant information.

14 Claims, 5 Drawing Sheets

6,047,264

METHOD FOR SUPPLYING AUTOMATIC STATUS UPDATES USING ELECTRONIC MAIL

This application is a continuation-in-part of U.S. patent application Ser. No. 08/695,095, filed Aug. 8, 1996 now abandoned.

BACKGROUND OF THE INVENTION

1. Field of the Invention

The present invention relates generally to electronic commerce and more particularly to updating customers as to the status of their orders and order shipments.

2. Description of the Related Art

In the mail order industry, it is common practice to notify customers by mail when their orders are backlogged or their shipments will be delayed for some reason. The advent of wide area electronic networks like the Internet has made it possible for customers to query the status of their orders and shipments by directly accessing the merchants' and shippers' information systems. For example, both Federal Express® (FedEx®) and United Parcel Service (UPS®) have world wide web sites on the Internet where customers can track the shipping status of their packages by simply inputting the package's tracking number to a computer form on a web page.

There is an advantage however, to notifying customers by mail when their shipments will be delayed, because the customer is not required to take any action to receive this notification—that is, the customer does not have to proactively access the Internet or other network, go to the shipper's world wide web site, and obtain and input a parcel tracking number in order to check on the shipping status.

In U.S. Pat. No. 5,428,778 to Brookes, a keyword based profile is used to match information coming into a system with the users' interests. In Brookes, the user is alerted to the presence of the information in the database (perhaps because there is a delivery fee associated with the information), but the information is not actually delivered to the user.

Also in the related art are several Internet-based electronic mail systems that deliver information to users daily via E-mail based on personal profiles. There are, for example, several stock quotation services that electronically mail a list of a user's personal favorite stock prices each day. Unlike Brookes, such systems do deliver the information directly to the user. However, the user is required to submit an interest profile to the system in order to receive feedback.

There is a need in the art, therefore, for a system and method for automatically notifying a party of the status of a delivery without requiring submission of a status request or special profile information from the party.

SUMMARY OF THE INVENTION

The present invention overcomes the disadvantages of the background art by providing a method and system for automatically providing customers with their order status via electronic mail over a computer network without the aid of a human customer service representative and without the need for user profile information.

To address the shortcomings of the background art, the present invention provides, in a computer network enabling communication between a plurality of computers, a method for processing and transmitting update information, implemented as a program on a first computer within said network, the method comprising the steps of creating a record in response to an order submitted to the first computer by a first party, retrieving status information relevant to the order, updating the record in response to the retrieved status information, generating an electronic mail status message reflective of the updated record, and transmitting the electronic mail status message to the first party across the network.

For example, when a customer places an order with a merchant, the customer provides the merchant with an electronic mail address. Then, the merchant ships the order via a common carrier such as FedEx, UPS or the postal service. The system of the present invention periodically interrogates the carrier's information system via a computer network to check the transit status of the order. When the transit status, location, or other relevant information changes, the system automatically composes and transmits an electronic mail message to the customer, informing the customer of the status of the shipment. The system may send messages notifying the customer of such common events as (1) when the order is initially sent to the shipper, (2) when the shipment leaves the shipper's distribution center, (3) the current or approximate physical location of the shipment once the shipment is in transit (e.g., headed westbound on Interstate 70 between St. Louis and Kansas City), (4) when the shipment reaches a distribution terminal for transfer to another truck or form of carriage, and (5) when the shipment is received at the customer's location. Notifying business customers that the shipment has been received at a site is especially important because it often takes one to two days for a company's internal mail system to deliver a package to the customer's desk once it has been received at the site's receiving dock, front office or mail room.

The primary advantage of this system is that it results in higher customer loyalty because customers are kept well informed of the status of their orders or shipments without taking any additional action beyond providing an electronic mail address to the merchant or shipper. Moreover, since the cost of electronic mail transmissions is extremely low, the system and method lower costs for merchants or shippers to provide status information to their customers

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF A PREFERRED EMBODIMENT

Figure 1:
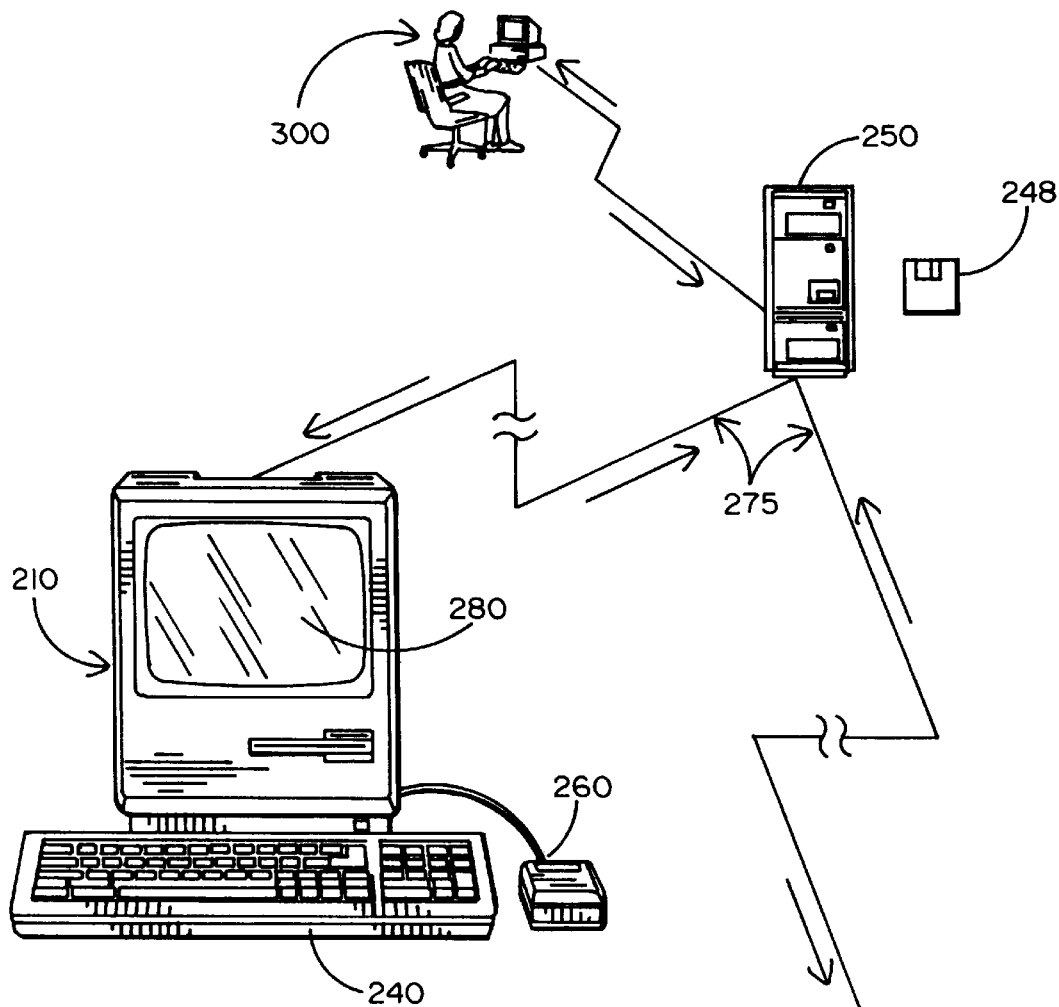
FIG. 1 illustrates a preferred computer environment for implementing the system and method of the present invention.

The present invention is preferably implemented as a computer program 248 running on a central server host computer shown in FIG. 1, attached to a wide area network 275 accessible by many potential customers through remote terminals 210 using keyboard 240, pointing device 260 and monitor 280. A preferred network for implementing the present invention is the Internet which is accessible by a significant percentage of the world population, although the network may also be a local area or limited area accessible network.

Figure 2:
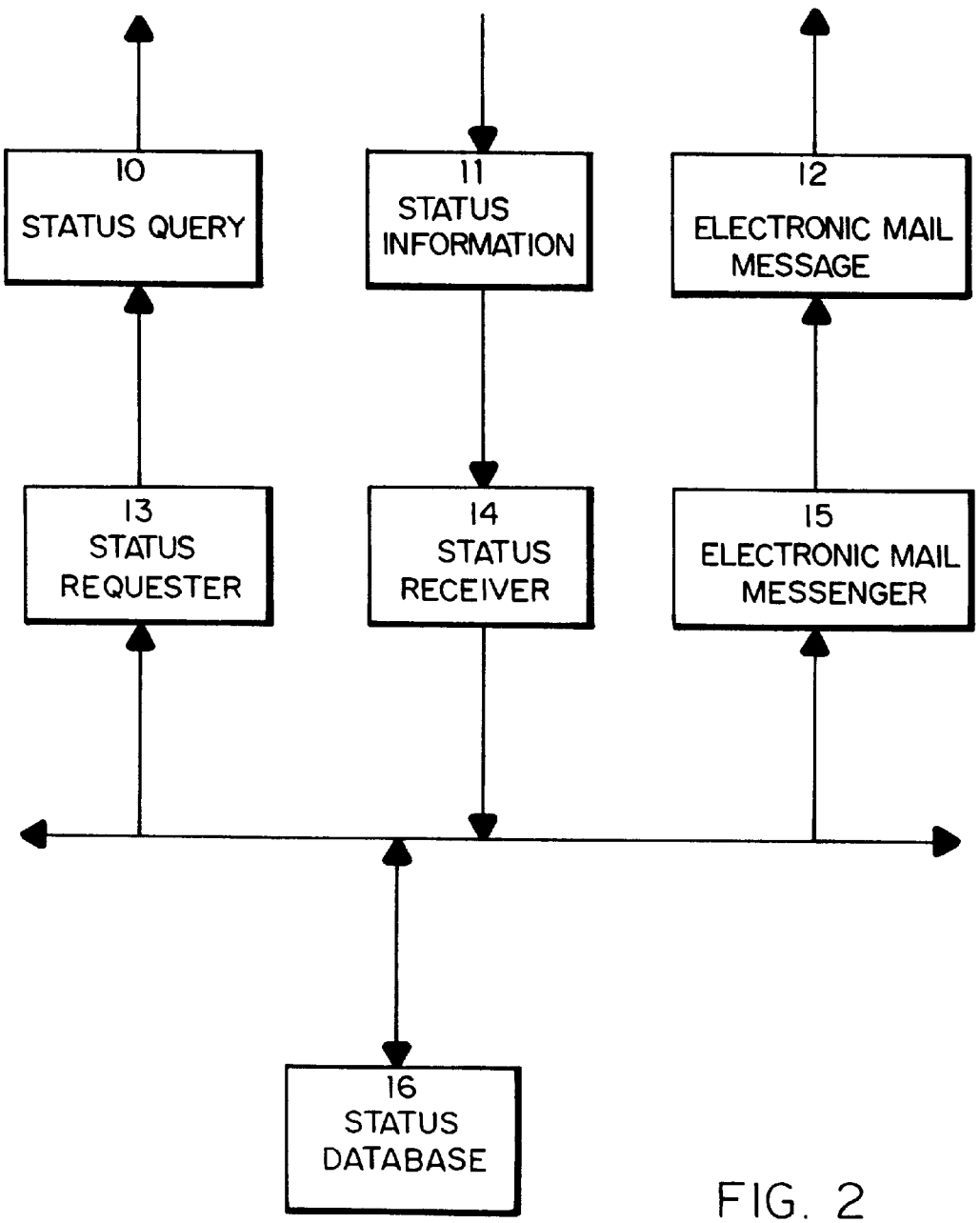
FIG. 2 is block diagram of components illustrating a preferred embodiment of the present invention.

Information about the customers and their respective orders is maintained in a status database 16 such as the one shown in FIG. 2. Status database 16 may be maintained on server 250 shown in FIG. 1. Individual customer orders may be placed in this database either by order entry personnel 300 or electronically by order entry systems also attached to wide area network 275 of FIG. 1. Status information in status database 16 may be updated manually by order entry personnel or electronically by other means such as status receiver 14 shown in FIG. 2.

Periodically via status Query 10, status requester 13, sends a status request to another host computer on wide area network 275, such as a common carrier shipping service like UPS or FedEx. Status information 11 is returned and received by status receiver 14 which places the new status information in status database 16. When status receiver 14 updates the status in status database 16, it sets a flag on the particular database record indicating a change in status.

Periodically, electronic mail messenger 15 checks status database 16, to see if the status of any record has changed, by examining the records' status flags. If a record has been flagged, then electronic mail messenger 15 composes an electronic mail message 12 based on the new status information in status database 16. This electronic mail message 12 is transmitted to the customer over the wide area network 275.

Figure 3:
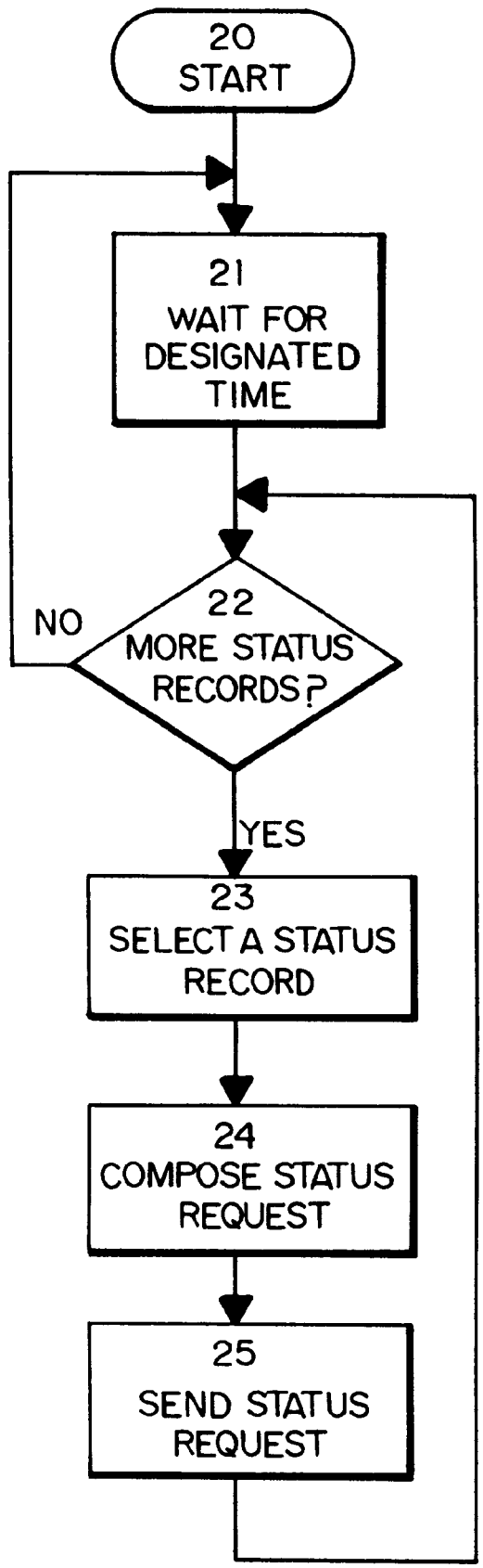
FIG. 3 is a flowchart illustrating the status requester and its method of operation.

FIG. 3 illustrates the operation of status requester 13. In a preferred embodiment, the status requester is continually running a program that periodically requests status updates from other host computers on wide area network 275. After waiting 21 for a designated time, which for a shipping status update is preferably every six to twenty-four hours, status database 16 is checked 22 to see if there are more status records. If so, then a status record is selected 23 and a status request is composed 24. This status request is sent 25 to another host computer on wide area network 275. This requesting process continues until each of the status records in status database 16 have been checked 22.

Figure 4:
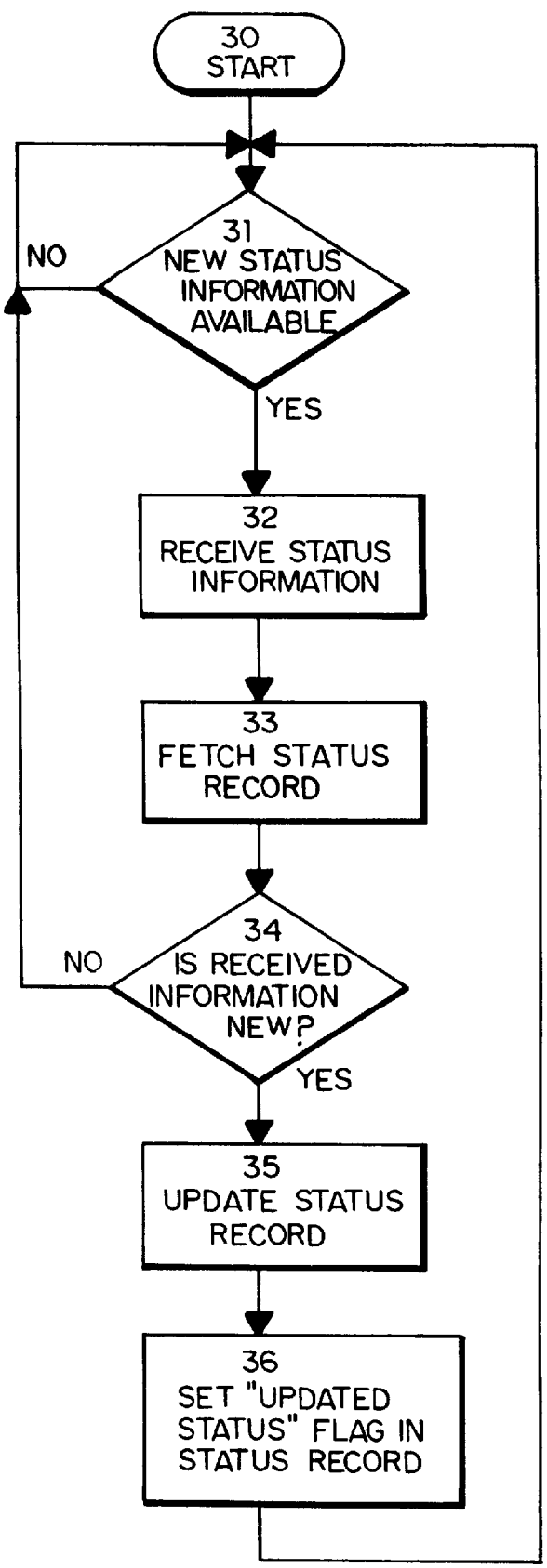
FIG. 4 is a flowchart illustrating the status receiver and its method of operation.

FIG. 4 illustrates the operation of status receiver 14. In the preferred embodiment, the status receiver is a continually running program that periodically receives status information 11 from another host computer on wide area network 275 based on requests generated by status requester 13. Wide area network 275 is continually checked for new status information 11. If new status information is found available at 31 then the status information is received 32 and the corresponding status record is fetched 33 from status database 16. The information is compared with that in the status record to determine 34 if the received information is new. If the received information is new, then the status record is updated 35 in status database 16 and the Updated Status flag is set 36 in the status record.

Figure 5:
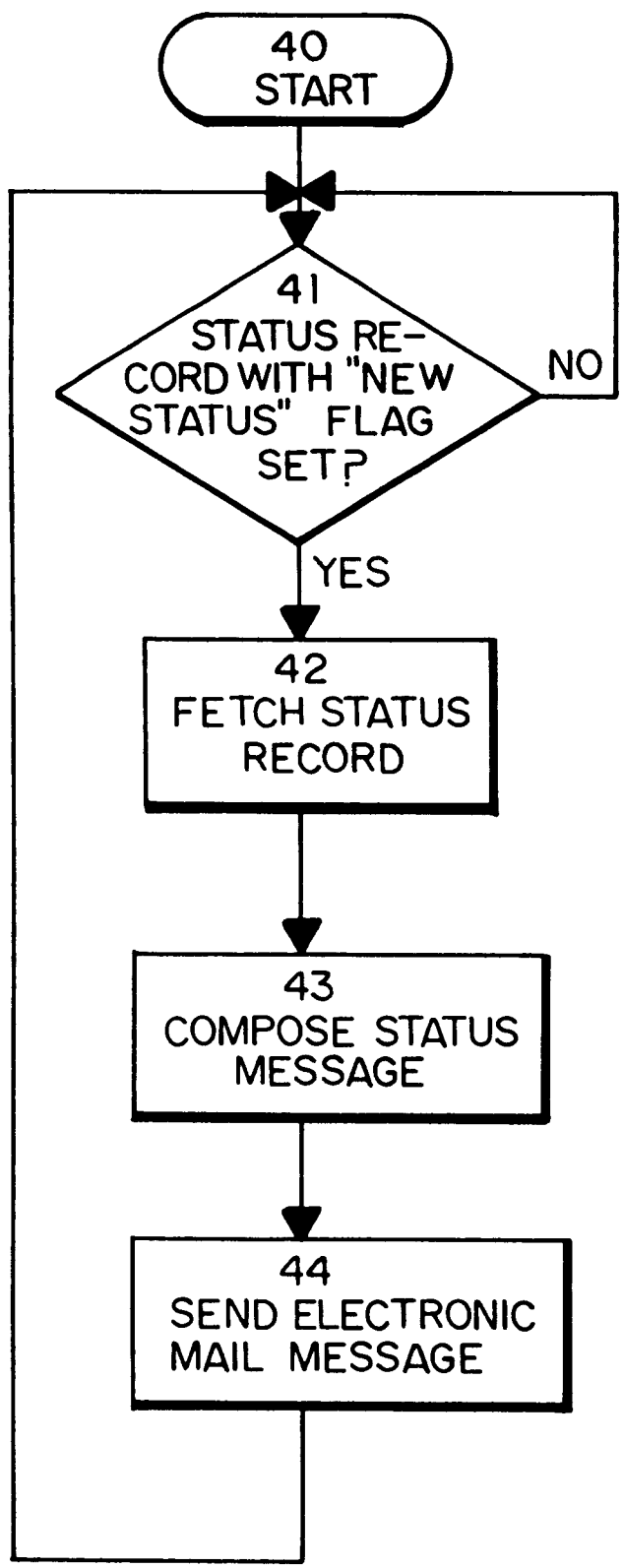
FIG. 5 is a flowchart illustrating the electronic mail messenger and its method or operation.

FIG. 5 illustrates the operation of electronic mail messenger 15. In a preferred embodiment, the electronic mail messenger is a continually running program that periodically checks 41 status database 16 to see if any records have an "Updated Status" flag set. If so, the appropriate status record is fetched 42 from status database 16 and an electronic mail message is composed 43 regarding the new status information. This electronic mail message is then preferably sent 44 to the recipient over wide area network 275.

One skilled in the art to which the present invention pertains will recognize that the various components of the system may communicate between themselves in a variety of ways. In a preferred embodiment, status receiver 14 signals electronic mail messenger 15, via an "Updated Status" flag in the appropriate database records, that a new update message should be sent. However, status receiver 14 could directly communicate with electronic mail messenger 15 to send a status update message without setting a signaling flag in status database 16 and awaiting discovery of such a flag by the electronic mail messenger.

One skilled in the art to which the present invention pertains will further recognize that components of status requester 13 and status receiver 14 may be combined into a single module that communicates with a remote host computer in a synchronous fashion. For example, the status requester portion of the combined module could send a status request to the remote host computer and wait for the status information to be received before proceeding to submit the next status request to the remote host computer. This type of synchronous operation is quite common in electronic data interchange applications.

The present invention is preferably implemented as a software program on a host computer such as 250 in FIG. 1 within a network 275 such as the Internet. The program may be loaded onto computer 250 from disk 248 or a similar storage medium.

A general description of the present invention as well as a preferred embodiment of the present invention has been set forth above. Those skilled in the art to which the present invention pertains will recognize and be able to practice additional variations to the methods and system described within the teachings of this invention. Accordingly, all such modifications and additions are deemed to be within the scope of the invention which is to be limited only by the appended claims.

What is claimed is:

1. In a computer network enabling communication between a plurality of computers, a method comprising the steps of:

(a) receiving information relevant to an order submitted by a user;

(b) collecting information relevant to an order processing status of said order;

(c) updating said information received at step (a) with said order processing status information collected at step (b);

(d) generating a message containing said order processing status information collected at step (b);

(e) automatically transmitting said message generated at step (d) to said user across said network without interaction from the user.

2. The method of claim 1, wherein said order processing status information collected at step (b) relates to shipment status of an item specified in said order.

3. The method of claim 1, wherein said order information received at step (a) is contained on a first computer, order processing status information collected at step (b) is contained on a second computer removed from said first computer, and said first and second computer are communicatively linked across said network.

4. The method of claim 1, wherein said step (c) is performed manually.

5. The method of claim 1, wherein said order information received at step (a) is stored on a database within a first computer.

6. The method of claim 5, further comprising separately storing said order processing status information collected at step (b) on a database in a second computer.

7. The method of claim 1, wherein said message generated at step (d) is in an electronic mail format, and the user is identified by a network address.

8. In a computer network enabling communication between a plurality of computers, a system comprising:

storage means associated with a first computer for storing order information relating to an order submitted by a user;

requesting means associated with said first computer for automatically and periodically requesting order processing status for said order from a second computer;

updating means associated with said first computer for receiving said order processing status from said second computer, and for automatically updating said order information with said order processing status;

message generating means for automatically generating a message containing said order processing status responsive to a change in said order processing status; and, message transmission means for automatically transmitting said message across said network to a third computer associated with the user without interaction from the user.

9. The system of claim 8, wherein said order processing status indicates shipment of an item specified in said order.

10. The system of claim 8, wherein said first and second computers are remote each from the other and are communicatively linked across said network.

11. The system of claim 8, wherein said updating means is manually actuable for input of update information.

12. The system of claim 8, wherein said order information is stored on a database within said first computer.

13. The system of claim 12, wherein said order processing status is stored in a database in said second computer.

14. The system of claim 12, wherein said message is in an electronic mail format, and the user is identified by a network address.

* * * * *

UNITED STATES PATENT AND TRADEMARK OFFICE
CERTIFICATE OF CORRECTION

PATENT NO.    : 6,047,264
DATED         : April 4, 2000
INVENTOR(S)   : Fisher et al.

It is certified that error appears in the above-identified patent and that said Letters Patent is hereby corrected as shown below:

<u>Column 4,</u>
Line 38, cancel claims 1-7 and insert the following claims 1-8:

1. In a computer network enabling communication between a plurality of computers, a method comprising the steps of:
(a) receiving and storing at a first computer order information relating to an order submitted by a user;
(b) requesting automatically and periodically order processing status for said order from a second computer;
(c) receiving at said first computer said order processing status requested at step (b);
(d) updating said information with said order processing status received at step (c);
(e) generating automatically a message containing said order processing status received at step (c) responsive to a change in said order processing status; and,
(f) automatically transmitting said message across said network to a third computer associated with the user without interaction from the user.

2. The method of claim 1, wherein said order processing status requested at step (b) relates to shipment status of an item specified in said order.

3. The method of claim 1, wherein said first and second computers are removed each from the other and are communicatively linked across said network.

4. The method of claim 1, wherein said step (d) is performed manually.

5. The method of claim 1, wherein said order information received at step (a) is stored on a database within said first computer.

6. The method of claim 5, further comprising separately storing said order processing status requested at step (b) on a database in said second computer.

7. The method of claim 1, wherein said message generated at step (e) is in an electronic mail format, and the user is identified by a network address.

8. The method of claim 1, wherein said step (d) is performed automatically.

Column 5, line 7; Column 6, lines 6, 8, 11, 14, 16 and 19, renumber claims 8-14 to 9-15.

UNITED STATES PATENT AND TRADEMARK OFFICE
CERTIFICATE OF CORRECTION

PATENT NO.     : 6,047,264
DATED          : April 4, 2000
INVENTOR(S)    : Fisher et al.

It is certified that error appears in the above-identified patent and that said Letters Patent is hereby corrected as shown below:

<u>Column 6,</u>
Lines 6, 8, 11 and 14, for the claim reference number "8", each occurrence, should read -- 9 --.
Lines 16 and 18, for the claim reference number "12", each occurrence, should read -- 13 --.

Signed and Sealed this

Nineth Day of September, 2003

JAMES E. ROGAN
*Director of the United States Patent and Trademark Office*